United States Patent
Chang et al.

(10) Patent No.: US 8,724,034 B2
(45) Date of Patent: May 13, 2014

(54) APPARATUSES AND METHODS FOR SCANNING TELEVISION CHANNELS

(75) Inventors: Chiao-Chih Chang, Taipei (TW); Yi-Fu Chen, Taipei (TW); Ming-Luen Liou, Jhonghe (TW)

(73) Assignee: Mediatek Inc., Hsin-Chu (TW)

( * ) Notice: Subject to any disclaimer, the term of this patent is extended or adjusted under 35 U.S.C. 154(b) by 1378 days.

(21) Appl. No.: 12/120,071

(22) Filed: May 13, 2008

(65) Prior Publication Data

US 2009/0044244 A1 Feb. 12, 2009

Related U.S. Application Data

(60) Provisional application No. 60/954,578, filed on Aug. 8, 2007.

(51) Int. Cl.
*H04N 5/46* (2006.01)
*H04N 5/50* (2006.01)

(52) U.S. Cl.
USPC ............................................. 348/732; 348/729

(58) Field of Classification Search
None
See application file for complete search history.

(56) References Cited

U.S. PATENT DOCUMENTS

| | | | | |
|---|---|---|---|---|
| 5,699,125 | A * | 12/1997 | Rzeszewski et al. | 725/50 |
| 6,212,680 | B1 * | 4/2001 | Tsinberg et al. | 725/39 |
| 6,721,018 | B1 | 4/2004 | Shintani et al. | |
| 7,155,196 | B1 * | 12/2006 | Beard | 455/339 |
| 2002/0097344 | A1 | 7/2002 | Shibusawa | |
| 2004/0036811 | A1 | 2/2004 | Ikeguchi | |
| 2005/0075077 | A1 * | 4/2005 | Mach et al. | 455/67.13 |
| 2006/0290822 | A1 | 12/2006 | Wada | |
| 2007/0002961 | A1 * | 1/2007 | Hoctor et al. | 375/267 |
| 2007/0249307 | A1 * | 10/2007 | Rybicki et al. | 455/137 |

FOREIGN PATENT DOCUMENTS

| | | |
|---|---|---|
| CN | 1885927 A | 12/2006 |
| JP | 2004-349963 A | 12/2004 |
| JP | 2006-197166 A | 7/2006 |
| KR | 10-2006-0097914 A | 9/2006 |
| WO | 0145257 A1 | 6/2001 |

OTHER PUBLICATIONS

PCT International Search Report and Written Opinion; International Application No. PCT/CN2008/071859; Dated: Nov. 13, 2008; International Searching Authority, The State Intellectual Property Office, People's Republic of China.

(Continued)

*Primary Examiner* — Kieu Oanh T Bui
(74) *Attorney, Agent, or Firm* — Murabito, Hao & Barnes LLP; Andrew D. Fortney (57) ABSTRACT

Apparatuses and methods for scanning channels in a television signal receiver. The apparatuses generally include a first acquisition circuit, a second acquisition circuit, and a controller. The first acquisition circuit is generally configured to determine, during a first time period, whether a selected radio frequency channel has a first format and to produce a first acquisition indicator in response thereto. The second acquisition circuit is generally configured to determine, during a second time period overlapping the first time period, whether the selected radio frequency channel has a second format and to produce a second acquisition indicator in response thereto. The controller is generally configured to scan a plurality of radio frequency channels by operating the first acquisition circuit and the second acquisition circuit for each one of the plurality of radio frequency channels. Embodiments advantageously provides for faster scanning and acquisition of television signals in a mixed-format (e.g., analog and digital) television distribution environment.

25 Claims, 8 Drawing Sheets

(56) References Cited

OTHER PUBLICATIONS

Takaaki Konishi; "Receiving Device"; Patent Abstracts of Japan; Publication No. 2006197166 A; Publication Date: Jul. 27, 2006; Japanese Patent Office, Japan.

Masa Motoyama; "Analog/Digital Broadcast Receiver"; Patent Abstracts of Japan; Publication No. 2004349963 A; Publication Date: Sep. 12, 2004; Japanese Patent Office, Japan.

Naoyuki Wada; "Electronic Apparatus and Method of Detecting a Channel"; esp@cenet; Chinese Publication No. CN1885927 (A); Publication Date: Dec. 27, 2006; esp@cenet database—Worldwide, http://v3.espacenet.com/publicationDetails/biblio?KC=A& date=20061227&NR=1885927....

Tae Hee Kim; "Method for Shortening a Channel Scanning Time in an Image Displace Device for Both Analog Broadcasting and Digital Broadcasting, Particularly Concerned in Scanning Channels for Digital Broadcasting Except Channels Containing Analog Broadcasting Signals"; Korean Patent Abstracts; Publication No. 1020060097914 A; Publication Date: Sep. 18, 2006; Korean Intellectual Property Office, Republic of Korea.

* cited by examiner

APPARATUSES AND METHODS FOR SCANNING TELEVISION CHANNELS

RELATED APPLICATIONS

This application claims the benefit of U.S. Provisional Application No. 60/954,578, filed Aug. 8, 2007, incorporated herein by reference in its entirety.

FIELD OF THE INVENTION

The present invention generally relates to the field of analog and digital television reception. More specifically, embodiments of the present invention pertain to apparatuses and methods for scanning digital and analog television signals.

BACKGROUND

In over-the-air (OTA) and cable television distribution systems, television signals may be encoded in analog and/or digital formats. The encoded signals may then be modulated into a channel using digital or analog modulation. Different regions of the world use different transmission standards, which dictate the parameters of transmitted television signals. For example, in North America television signals may be transmitted OTA in the analog NTSC (National Television System Committee) format and/or the digital ATSC (Advanced Television Systems Committee) format. In addition, television signals may be transmitted through cables that connect to a television or associated set-top box. For example, many cable systems use QAM (Quadrature Amplitude Modulation), which includes variants such as 64-QAM, 256-QAM, etc.

Figure 1:
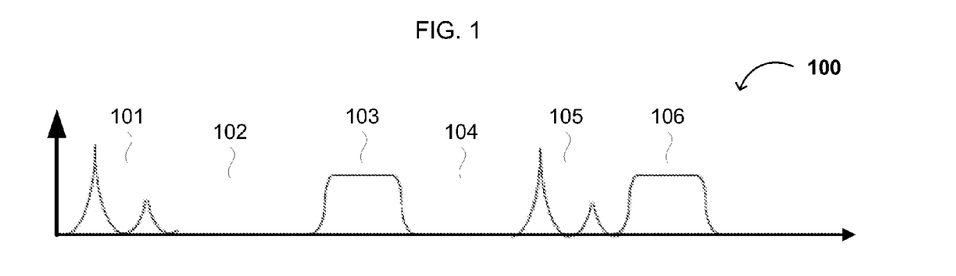
FIG. 1 is a graph of a frequency spectrum including analog and digital television signals.

In most television distribution systems, the available bandwidth is divided into channels, where each channel is allocated approximately 6-8 MHz of bandwidth. Each channel may include a digital or analog signal (or no signal). FIG. 1 is a graph of a frequency spectrum with channels 101-106. Channels 101 and 105 are analog channels, channels 103 and 106 are digital channels, and channels 102 and 104 have no signal.

Figure 2:
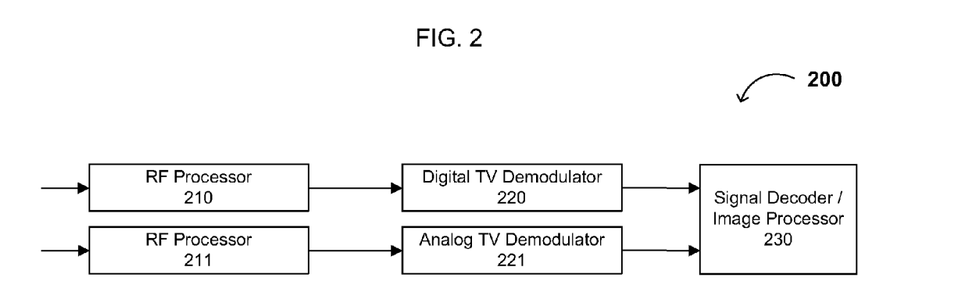
FIG. 2 is a diagram showing a conventional arrangement for decoding multiple television formats using multiple tuners.
Figure 3:
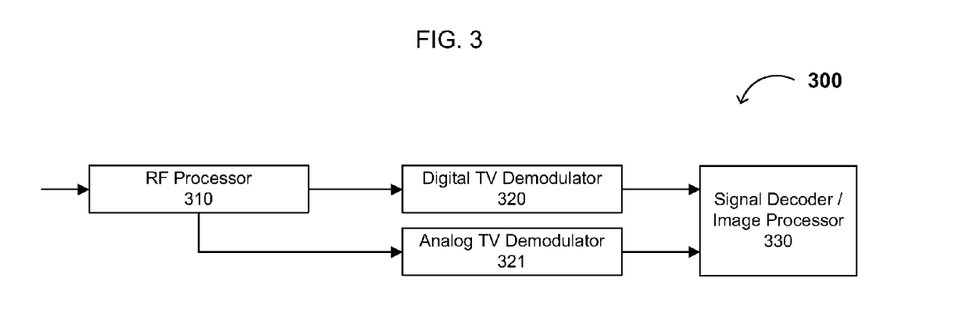
FIG. 3 is a diagram showing a conventional arrangement for decoding multiple television formats using a single tuner.

Television receivers may include set top boxes, integrated televisions, video capture devices, personal video recorders, and/or other devices such as general purpose computers with software and/or hardware for tuning, demodulating and/or decoding television signals. FIGS. 2 and 3 show conventional arrangements 200 and 300 for demodulating and decoding multiple television formats. In FIG. 2, digital demodulator 220 and analog demodulator 221 receive tuned signals (e.g., intermediate frequency signals and/or digital samples) from separate radio frequency processors 210 and 211, respectively. Radio frequency processors 210 and 211 both generally tune a radio frequency channel (e.g., a band of frequencies such as band 101, 102, 103, etc. in FIG. 1), and may further process the tuned signal (e.g., to produce digital samples of the tuned channel). Demodulators 220 and 221 provide a demodulated signal to signal decoder/image processor 230 for further processing. In FIG. 3, digital demodulator 320 and analog demodulator 321 receive tuned signals from a single radio frequency processor 310.

Television receivers often need to scan a number of radio frequency channels when they are first set up (or when they are reconfigured) to initialize channel parameters. The setup scan may be used, for example, to set up a list of available channels, to pre-determine whether the channel is analog or digital, and/or to pre-determine other characteristics of each channel to enable faster signal acquisition when a user selects a channel to display.

Figure 4A:
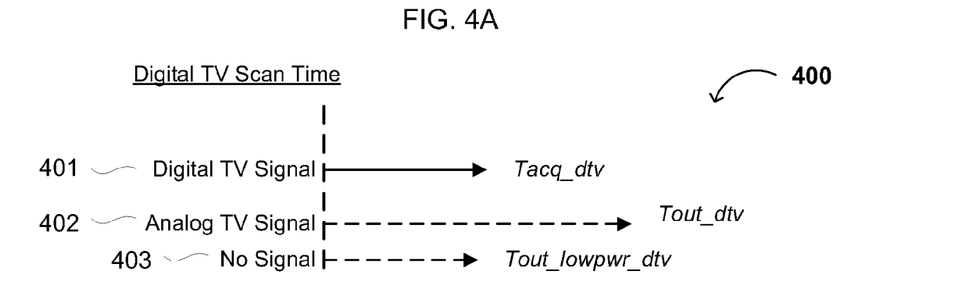
FIGS. 4A-B are graphs of conventional television signal acquisition times.

FIG. 4A shows a graph 400 of times to scan a channel with a digital demodulator (e.g., digital demodulator 220 or 320). Time 401 represents an exemplary length of time Tacq_dtv for acquiring a digital television signal (e.g., when the channel does contain a digital signal). Time 402 represents an exemplary length of time Tout_dtv for the digital demodulator to time out when the signal cannot be demodulated (e.g., when the channel contains an analog television signal). Time 403 represents an exemplary length of time Tout_lowpwr_dtv for the digital demodulator to time out when no signal is present.

Figure 4B:
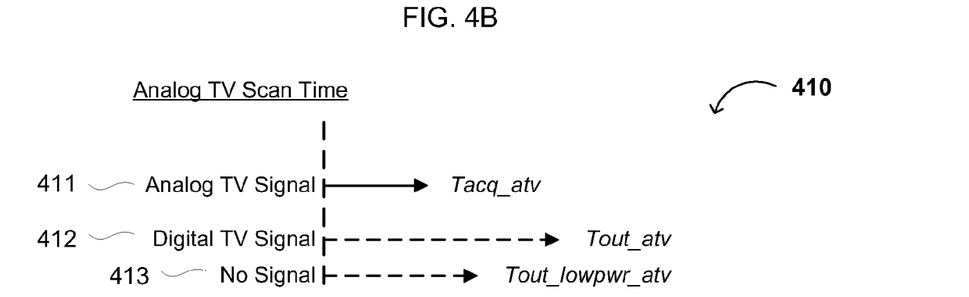

Similarly, FIG. 4B shows a graph 410 of times to scan a channel with an analog demodulator (e.g., analog demodulator 221 or 321). Time 411 represents an exemplary length of time Tacq_atv for acquiring an analog television signal (e.g., when the channel does contain an analog signal). Time 412 represents an exemplary length of time Tout_atv for the analog demodulator to time out when the signal cannot be demodulated (e.g., when the channel contains a digital television signal). Time 413 represents an exemplary length of time Tout_lowpwr_atv for the digital demodulator to time out when no signal is present.

Figure 4C:
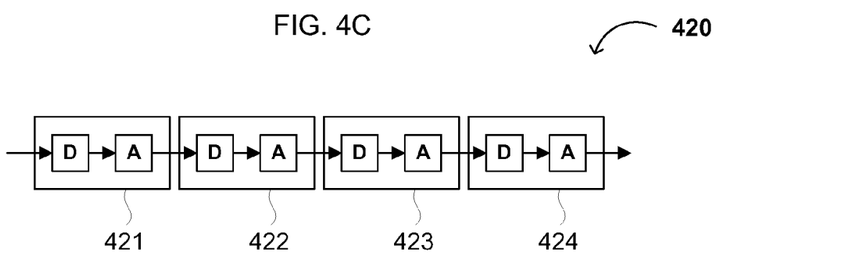
FIG. 4C is a flowchart showing conventional television signal acquisition timing.

Conventional receivers generally scan a range of frequencies by attempting to scan each channel using a first mode (e.g., using a digital demodulator) and then using a second mode (e.g., using an analog demodulator) if the first mode fails. FIG. 4C shows a flowchart showing conventional television signal acquisition timing. A receiver may, for example, scan a first channel (e.g., channel 101) during time period 421, a second channel (e.g., channel 102) during time period 422, etc.). For each channel, the receiver first tries to scan the channel digitally and, if the digital scan fails, the receiver tries to scan the channel as an analog channel. Thus, the total time to scan channels 101-106 would be (2*Tacq_dtv)+(2*Tout_dtv)+(2*Tacq_atv)+(2*Tout_lowpwr_dtv)+(2*Tout_lowpwr_atv). Television receiving components are often benchmarked and compared based on channel scan time and stability. Therefore it is desirable to reduce the amount of time spent scanning channels in a mixed-format environment without sacrificing stability.

SUMMARY

Embodiments of the present invention relate to apparatuses and methods for scanning channels in a television signal receiver. The apparatuses generally include a first acquisition circuit, a second acquisition circuit, and a controller. The first acquisition circuit is generally configured to determine, during a first time period, whether a selected radio frequency channel has a first format and to produce a first acquisition indicator in response thereto. The second acquisition circuit is generally configured to determine, during a second time period overlapping the first time period, whether the selected radio frequency channel has a second format and to produce a second acquisition indicator in response thereto. The controller is generally configured to scan a plurality of radio frequency channels by operating the first acquisition circuit and the second acquisition circuit for each one of the plurality of radio frequency channels.

In a further embodiment, the controller is further configured to operate the first acquisition circuit and the second acquisition circuit in response to states of the first acquisition indicator and the second acquisition indicator. For example, the controller may be configured to terminate operation of the second acquisition circuit when the first acquisition indicator has a state indicating successful acquisition.

In some embodiments, the controller may be configured to change the selected radio frequency channel to a newly selected channel from the plurality of radio frequency channels when at least one of the acquisition indicators has a state indicating successful acquisition. For example, the controller may be configured to terminate operation of the first acquisition circuit and the second acquisition circuit for the first channel before changing the selected channel and to start operation of the first acquisition circuit and the second acquisition circuit after changing the selected channel.

In another embodiment, the controller may be configured to change the selected radio frequency channel to a newly selected channel from the plurality of radio frequency channels when both of the acquisition indicators have states indicating unsuccessful acquisition. The state indicating unsuccessful acquisition may, for example, indicate a timeout in trying to acquire the signal.

In yet another embodiment, the first format is a digital television format and the second format is an analog television format. Thus, the apparatus may further comprise a tuner configured to tune the selected radio frequency channel to produce an analog tuned signal and an analog-to-digital converter (ADC) configured to convert the analog tuned signal into a digital tuned signal. The first acquisition circuit may comprise a digital television demodulator. Thus, the first acquisition indicator may have a first state when the digital television demodulator successfully demodulates the digital tuned signal and a second state when the digital television demodulator fails to demodulate the digital tuned signal.

In a further embodiment, the second acquisition circuit may comprise an analog television demodulator, and the second acquisition indicator may have a third state when the analog television demodulator successfully demodulates an analog television signal from the digital tuned signal or the analog tuned signal and has a fourth state when the analog television demodulator fails to demodulate the second digital signal.

Embodiments of the methods for scanning channels in a television signal receiver generally include steps of determining, during a first time period, whether a selected radio frequency channel has a first format and producing a first acquisition indicator in response thereto, determining, during a second time period overlapping the first time period, whether the selected radio frequency channel has a second format and producing a second acquisition indicator in response thereto, and scanning a plurality of radio frequency channels by repeating the determining steps for each one of the plurality of radio frequency channels. In one exemplary embodiment, the method includes storing the first acquisition indicator, the second acquisition indicator, and/or derivatives thereof for each of the plurality of radio frequency channels (e.g., to store a list of available channels and/or the format of each channel).

A further embodiment of the method includes performing the scanning in response to the first acquisition indicator and the second acquisition indicator. For example, scanning may include terminating the step of determining whether the selected channel has the second format when the first acquisition indicator has a successful state. In another embodiment, the scanning step further comprises changing the selected radio frequency channel to a newly selected channel from the plurality of selected radio frequency channels when at least one of the acquisition indicators has a successful state. In a further embodiment, the scanning step includes terminating the determining steps for the selected channel before changing the selected channel and starting the determining steps for the newly selected channel.

In another embodiment, the scanning step further comprises changing the selected radio frequency channel to a newly selected channel from the plurality of selected radio frequency channels when both of the acquisition indicators have unsuccessful states. The unsuccessful state may, for example, indicate that acquisition has timed out.

When one of the formats is a digital television format and the other format is an analog television format, the method may further include steps of tuning the selected radio frequency channel to produce an analog tuned signal and converting the analog tuned signal into a digital tuned signal.

In a further embodiment, the method includes attempting to demodulate a digital television signal from the digital tuned signal, and the step of producing the first acquisition indicator includes setting the first acquisition indicator to a first state when the digital television signal is successfully demodulated and setting the first acquisition indicator to a second state when the digital tuned signal is not successfully demodulated. In a still further embodiment, the method may include attempting to demodulate an analog television signal from the digital tuned signal or the analog tuned signal, and the step of producing the second acquisition indicator includes setting the second acquisition indicator to a third state when the analog television signal is successfully demodulated and setting the second acquisition indicator to fourth state when the analog television signal is not successfully demodulated.

Embodiments of the present invention may include set top boxes, televisions, video capture devices, personal video recorders, general purpose computers, and/or other devices incorporating one or more of the inventive concepts disclosed herein. Embodiments may also include software, firmware, or other computer-readable media including a computer executable set of instructions adapted to perform one or more of the operations and/or methods described herein.

Embodiments of the present invention advantageously provide for faster scanning and acquisition of television signals in a mixed-format (e.g., analog and digital) television distribution environment. These and other advantages of the present invention will become readily apparent from the detailed description of preferred embodiments below.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of processes, procedures, logic blocks, functional blocks, processing, and other symbolic representations of operations on data bits, data streams, or waveforms within a computer, processor, controller, and/or memory. These descriptions and representations are generally used by those skilled in the data processing arts to effectively convey the substance of their work to others skilled in the art. A process, procedure, logic block, function, operation, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer, data processing system, or logic circuit. It has proven convenient at times, principally for reasons of common usage, to refer to these signals as bits, waves, waveforms, streams, values, elements, symbols, characters, terms, numbers, or the like.

It should be borne in mind, however, that all of these and similar terms are associated with the appropriate physical quantities and are merely convenient labels applied to these quantities. Unless specifically stated otherwise and/or as is apparent from the following discussions, it is appreciated that throughout the present application, discussions utilizing terms such as "processing," "operating," "computing," "calculating," "determining," "manipulating," "transforming," "displaying" or the like, refer to the action and processes of a computer, data processing system, logic circuit or similar processing device (e.g., an electrical, optical, or quantum computing or processing device), that manipulates and transforms data represented as physical (e.g., electronic) quantities. The terms refer to actions, operations and/or processes of the processing devices that manipulate or transform physical quantities within the component(s) of a system or architecture (e.g., registers, memories, other such information storage, transmission or display devices, etc.) into other data similarly represented as physical quantities within other components of the same or a different system or architecture.

Furthermore, for the sake of convenience and simplicity, the terms "clock," "time," "rate," "period" and "frequency" are generally used interchangeably herein, but are generally given their art-recognized meanings. Also, for convenience and simplicity, the terms "bitstream," "data," "data stream," "waveform" and "information" may be used interchangeably, as may the terms "connected to," "coupled with," "coupled to," and "in communication with" (which terms also refer to direct and/or indirect relationships between the connected, coupled and/or communication elements unless the context of the term's use unambiguously indicates otherwise), but these terms are also generally given their art-recognized meanings.

The invention, in its various aspects, will be explained in greater detail below with regard to exemplary embodiments.

Exemplary Apparatuses for Scanning For Digital and Analog Formats

Figure 5A:
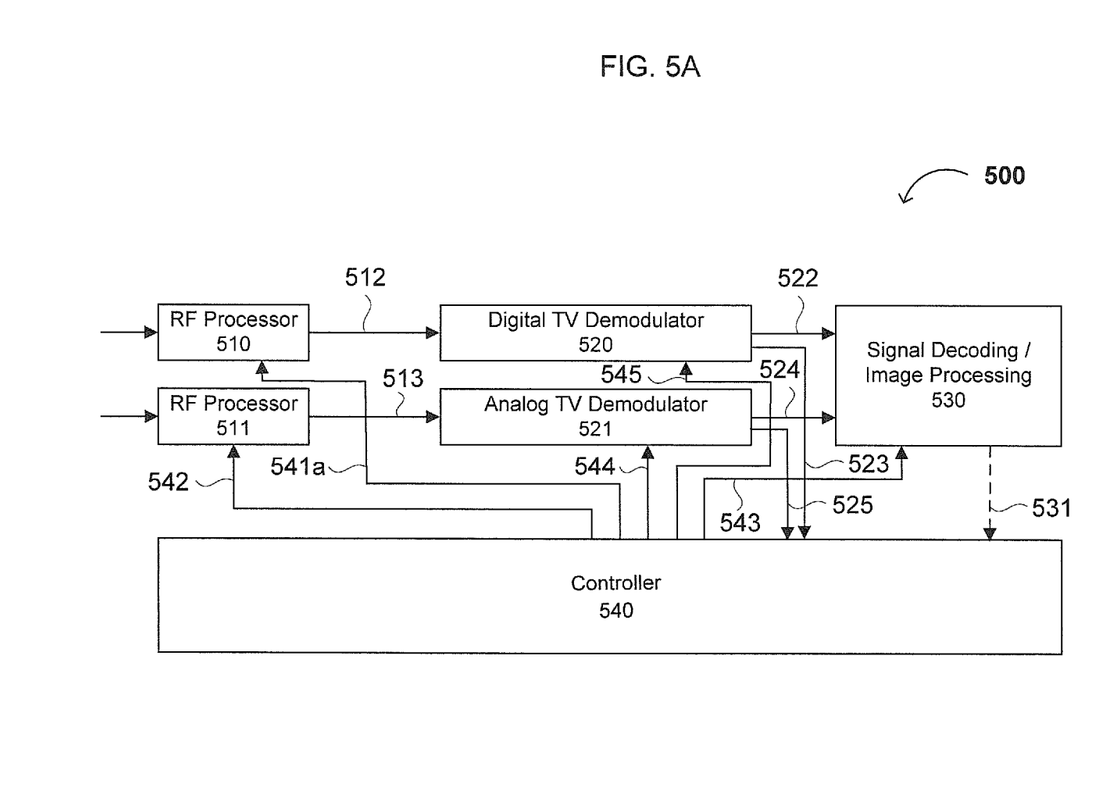
FIGS. 5A-B are diagrams showing embodiments of apparatuses for scanning analog and digital television signals according to the present invention.
Figure 5B:
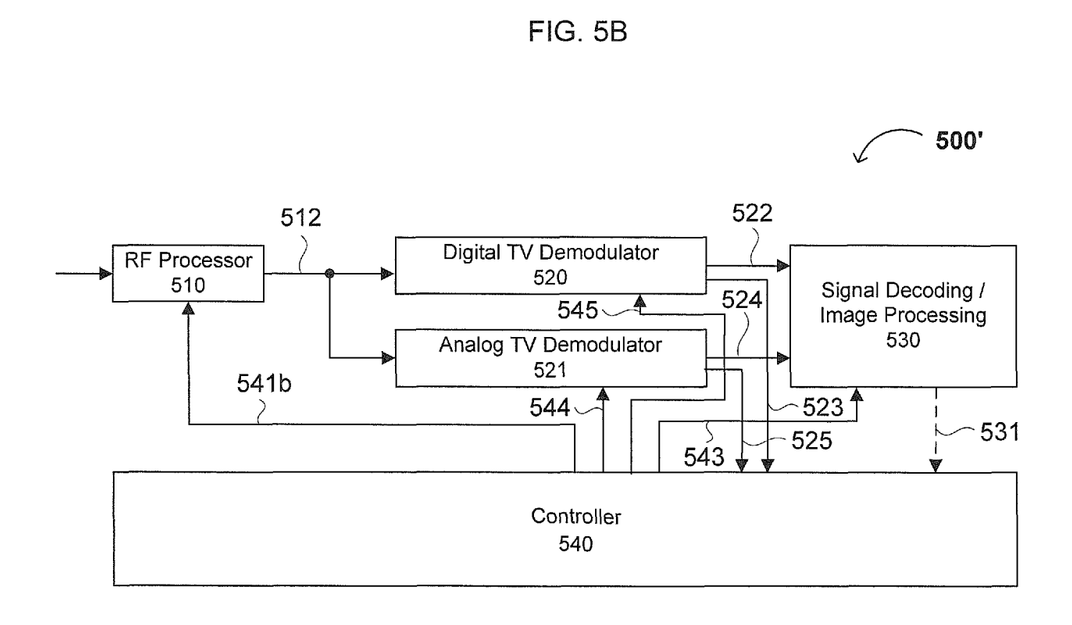

FIGS. 5A and 5B show exemplary apparatuses 500 and 500' for scanning channels in a television signal receiver. The apparatuses generally scan a plurality of radio frequency channels to determine the format of each of the channels. For each channel, the apparatuses try to demodulate the channel using multiple demodulators at substantially the same time, and proceed to the next channel when the format of the current channel has been determined (or has failed to be determined). The channel scanning operations may be used, for example, to pre-determine a signal format, transmission parameters, preview images, anchor frames, and/or other characteristics of a group of television channels. The group of channels may include a user's favorite channels, channels close to a currently-viewed channel, a pre-determined range of channels (e.g., channels to which the user subscribes) or other group of channels.

Apparatus 500 includes two radio frequency (RF) processors 510 and 511. Apparatus 500' includes a single RF processor 510. The RF processors may include, for example, tuners, analog-to-digital converters (ADCs), and/or other components for processing one or more radio signals before demodulation. The RF processors generally produce intermediate signals, which may be analog or digital. Digital television demodulator 520 generally attempts to demodulate a digital data stream from intermediate signal 512 produced by RF processor 510. In apparatus 500, analog television demodulator 521 attempts to demodulate an analog television signal from intermediate signal 513 produced by RF processor 511. In the alternative exemplary embodiment of apparatus 500', analog television demodulator 521 attempts to demodulate an analog television signal from intermediate signal 512 produced by RF processor 510 (e.g., analog television demodulator 521 demodulates the same intermediate signal as digital television demodulator 520).

Controller 540 may be configured to control RF processors 510 and/or 511 using signals 541a and 542, respectively, (e.g., to change a tuning frequency) and to control demodulators 520 and 521 (e.g., to start, stop, or otherwise adjust demodulation). Digital demodulator 520 may be configured to determine, during a first time period, whether a selected radio frequency channel (e.g., a radio frequency channel tuned by RF processor 510) has a first format and to produce a first acquisition indicator 523 in response to that determination. Digital demodulator 520 generally operates in response to control signals 545 from controller 540, and provides acquisition indicator 523 to controller 540. Similarly, analog demodulator 521 may be configured to receive control signals 544 from controller 540 and to determine, during a second time period, whether the selected radio frequency channel has a second format (e.g., an analog television format). Analog demodulator 521 generally operates in response to control signals 544 from controller 540, and provides acquisition indicator 525 to controller 540.

Figure 6A:
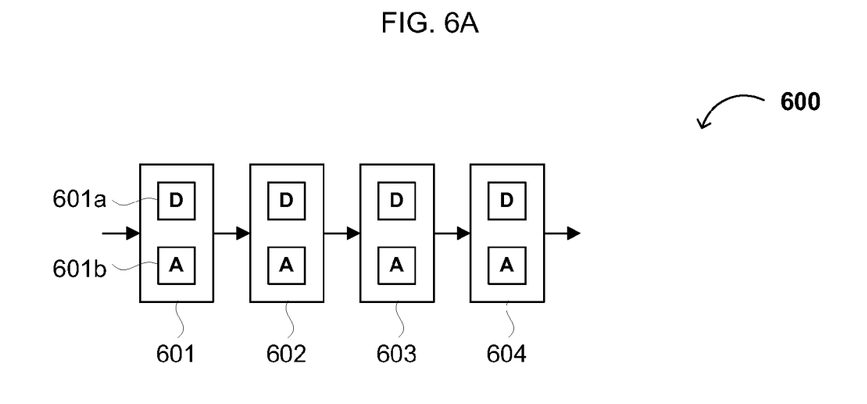
FIG. 6A is a flowchart showing television signal acquisition timing according to embodiments of the present invention.

FIG. 6A shows a flowchart 600 of an exemplary sequence for scanning a plurality of channels. During time period 601, RF processors 510 and 511 of apparatus 500 and RF processor 510 of apparatus 500' tune and/or otherwise process the selected radio frequency to produce an intermediate signal. Digital demodulator 520 operates during time period 601a. Analog demodulator 521 operates during time period 601b, which overlaps time period 601a. Thus, digital demodulator 520 and analog demodulator 521 attempt to demodulate each selected radio frequency channel in parallel. Controller 540 is generally configured to scan a plurality of radio frequency channels by operating the first acquisition circuit and the second acquisition circuit for each one of the plurality of radio frequency channels (e.g., during time periods 601, 602, 603, 604, etc.).

Controller 540 may be configured to operate RF processors 510 and 511 and demodulators 520 and 521 in response to states of acquisition indicators 523 and 525. For example, controller 540 may be configured to terminate operation of one or both of the demodulators 520 and 521 when either of the acquisition indicators has a state indicating successful acquisition. In addition, when a channel is successfully acquired the demodulated signal 522/524 may be provided to signal decoder/image processor 530 for further processing. Such processing may, for example, include extracting transmission or other parameters from the signal, capturing preview and/or anchor images, and/or otherwise obtaining characteristics of the channel. Controller 540 may then change the channel processed by RF processor 510 and/or RF processor 511 and restart demodulators 520 and 521 to determine the format of another RF channel. Controller 540 may also change the scanning channel when both acquisition indicators indicate unsuccessful acquisition. Controller 540 and signal decoder/image processor 530 can communicate using signals 531 and 543.

Figure 6B:
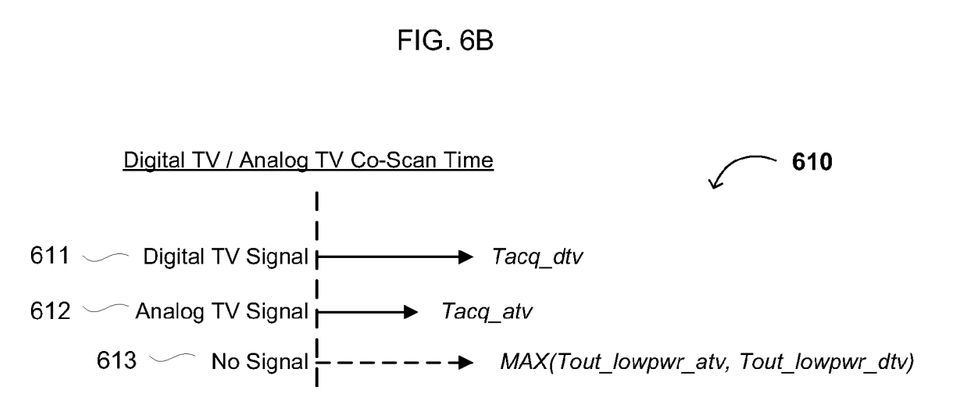
FIG. 6B is a graph of television signal acquisition times according to embodiments of the present invention.

FIG. 6B shows an exemplary graph of television signal acquisition times. Time 611 represents an exemplary time Tacq_dtv for acquiring a digital television signal, after which point digital television demodulator may set acquisition indicator 523 to a state indicating successful acquisition of the digital television signal. Time 612 represents an exemplary time Tacq_atv for acquiring an analog television signal, after which point analog television demodulator 521 may set acquisition indicator 525 to a state indicating successful acquisition of the analog television signal. Time 613 represents an exemplary time to determine that there is no signal (or no signal that can be demodulated) in the present channel. Time 613 is generally the higher of Tout_lowpwr_dtv and Tout_lowpwr_atv, where Tout_lowpwr_dtv is the timeout or low power period for attempting to demodulate a digital televisions signal and Tout_lowpwr_atv, is the timeout or low power period for attempting to demodulate an analog television signal. Thus, controller 540 may change to another channel after time Tacq_dtv when the current channel is a digital channel, after time Tacq_atv when the current channel is an analog channel, and after time MAX(Tout_lowpwr_dtv, Tout_lowpwr_atv) when there is no signal on the current channel. If Tout_lowpwr_atv is less than Tout_lowpwr_dtv, then scanning for both analog and digital television channels in systems according to the present invention takes no more time than scanning only for digital television signals.

In some embodiments, the exemplary apparatuses presented herein may be implemented on a single integrated circuit device. For example, a single integrated circuit device (e.g., an application specific integrated circuit [ASIC], a system-on-chip [SOC], a digital signal processor [DSP], etc.) or other device may include components for tuning, demodulating, and processing radio frequency channels as described herein. Such devices may also be programmable or otherwise configurable (e.g., by updating software and/or firmware, programming a field programmable gate array [FPGA], etc.). Thus, some embodiments may include software, firmware, or other instructions stored in a memory or other storage device and adapted to perform one or more of the operations described herein.

In other embodiments, the components and operations presented herein may be implemented in multiple integrated circuits or other devices. For example, tuning, demodulating, processing and/or controlling operations as described herein may each be implemented on one or more dedicated or general purpose devices.

Exemplary Apparatuses for Scanning Multiple Digital Formats

Figure 7A:
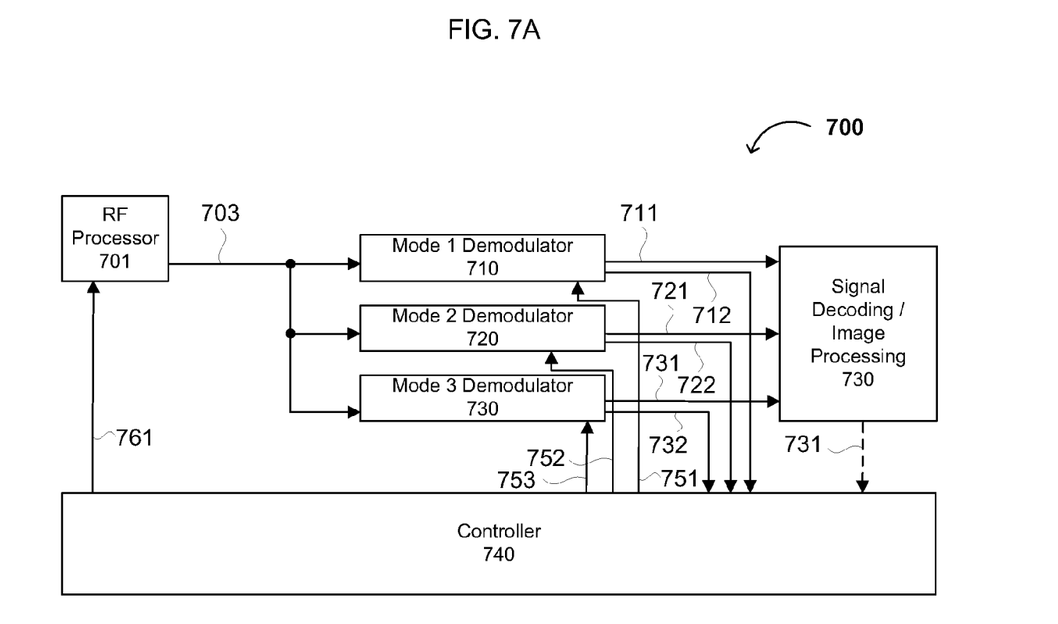
FIG. 7A is a diagram showing an exemplary embodiment of an apparatus having multiple demodulators.

FIG. 7A shows an exemplary embodiment of an apparatus 700 for scanning for scanning channels in a television signal receiver, where the channels may be encoded in one of a plurality of modes. For example digital television signals may be modulated using the Advanced Television Systems Committee (ATSC) format, a quadrature amplitude modulation (QAM) format, etc. Furthermore, multiple QAM formats may be present in a system. For example, in the United States both 64-QAM and 256-QAM formats may be present in digital cable systems. The apparatuses generally scan a plurality of radio frequency channels to determine the format of each of the channels. For each channel, the apparatuses try to demodulate the channel using multiple demodulators at substantially the same time, and proceed to the next channel when the format of the current channel has been determined (or has failed to be determined).

Apparatus 700 generally scans a plurality of radio frequency channels to determine the format of each of the channels by trying to demodulate the channel using each of the demodulators 710, 720, and 730 at substantially the same time for each radio frequency channel. Controller 740 generally controls RF processor 701 (e.g., to change a tuning frequency) and demodulators 710, 720, and 730 (e.g., to start, stop, or otherwise adjust demodulation). RF processor 701 tunes a selected radio frequency channel in response to control signal 761 to produce an intermediate signal 703. RF processor 701 may include, for example, one or more tuners, analog-to-digital converters (ADCs), and/or other components for processing one or more radio signals before demodulation.

Demodulators 710, 720, and 730 may be configured to demodulate different modes of a single digital television format, different digital television formats, one or more analog television formats, or any combination thereof. Thus, demodulator 710 may be configured to demodulate ATSC digital television signals, demodulator 720 may be configured to demodulate 64-QAM signals, and demodulator 730 may be configured to demodulate 256-QAM signals. It will be recognized, however, that the techniques presented herein may be applied to any number and combination of television formats and/or modes of such television formats.

Each demodulator 710, 720, and 730 generally attempts to demodulate intermediate signal 703 in response to a control signal from controller 740 (e.g., control signal 751, 752, and/or 753) and to produce an acquisition indicator (e.g., acquisition indicator 712, 722, and/or 732) in accordance with the demodulation. The acquisition indicators may, for example, indicate successful acquisition, acquisition timeout, or other acquisition status.

In the scanning mode of operation, controller 740 operates RF processor 701 in response to the acquisition indicators. For example, controller 740 may be configured to terminate operation of demodulators 710, 720, and 730 when one of the acquisition indicators has a state indicating successful acquisition. Controller 740 may then change the channel processed by RF processor 701 and restart the demodulators to determine the format of another RF channel. Controller 740 may also change the scanning channel when all of acquisition indicators indicate unsuccessful acquisition (e.g., when all of the demodulators have timed out).

Figure 7B:
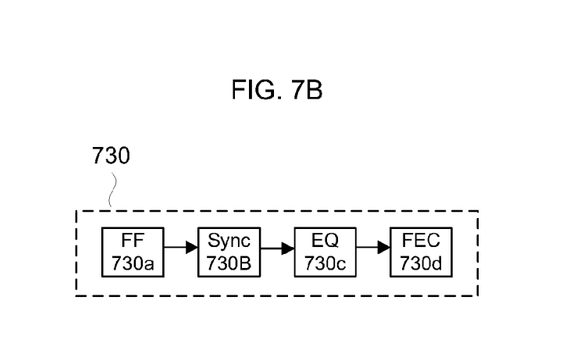
FIG. 7B is a diagram showing exemplary components of a demodulator.
Figure 7C:
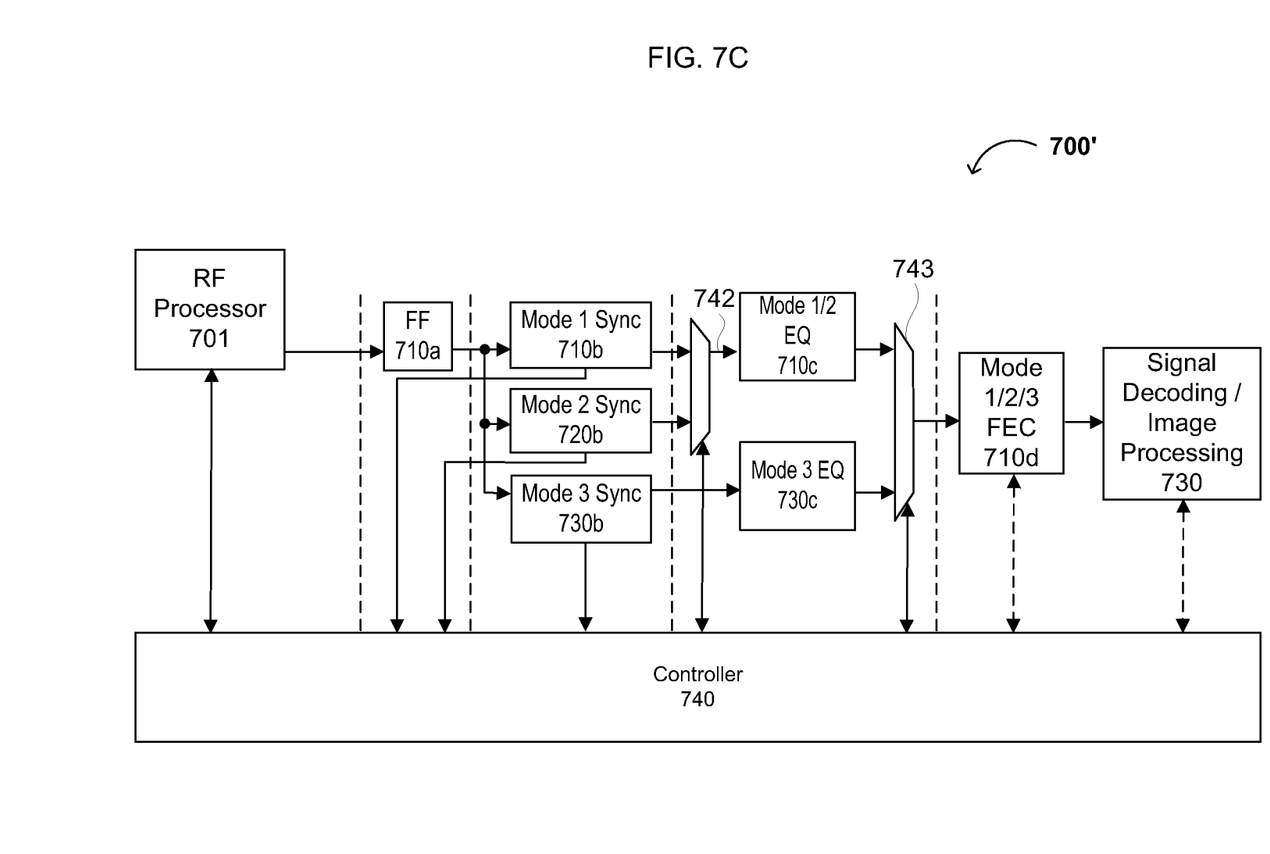
FIG. 7C is a diagram showing an exemplary embodiment of an apparatus having multiple demodulators with shared components.

FIG. 7B shows exemplary components of demodulator 730, including frontend filter component 730a, synchronization component 730b, equalization component 730c, and forward error correction (FEC) component 730d. In some embodiments, one or more of these or other components of the modulators may be shared. For example, FIG. 7C shows an exemplary apparatus 700' wherein some demodulation components are shared. In apparatus 700', frontend filter 710a may be used for all of the modes to be demodulated. Individual synchronize circuits 710b, 720b, and 730 may each receive an output of frontend filter 710a to attempt to synchronize to the selected RF channel. Thus, "mode 1" synchronizer 710b attempts to synchronize to the selected RF channel using a first demodulator mode, "mode 2" synchronizer 720b attempts to synchronize to the selected RF channel using a second demodulator mode, and "mode 3" synchronizer 730b attempts to synchronize to the selected RF channel using a third demodulator mode.

For some demodulation modes, it may be possible to distinguish between the first demodulator mode and the second demodulator mode after synchronization, but not between the first mode and the third mode. Thus, only one equalization module 710c may be needed to attempt to equalize the signal using either the first demodulation mode or the second demodulation mode at one time. Selector 742 may be a component of and/or controlled by controller 740 (not shown in FIG. 7C), and may be configured to select one of the outputs of synchronization modules 710b and 720b to provide to equalization module 710c in response to acquisition indicators produced by synchronization modules 710b and 720b.

If controller 740 is able to distinguish between the first, second, and third demodulator modes after equalization, then only one forward error correction module 710d may be needed. Selector 743 may be a component of and/or controlled by controller 740 (not shown in FIG. 7C), and may be configured to select one of the outputs of equalization modules 710c and 730c to provide to FEC module 710d in response to acquisition indicators produced by synchronization modules 710c and 730c. Thus, embodiments of the present invention such as apparatus 700' are able to scan each RF channel for multiple demodulation formats and/or modes without including a linearly increasing number of each demodulator component.

An Exemplary Method

Figure 8:
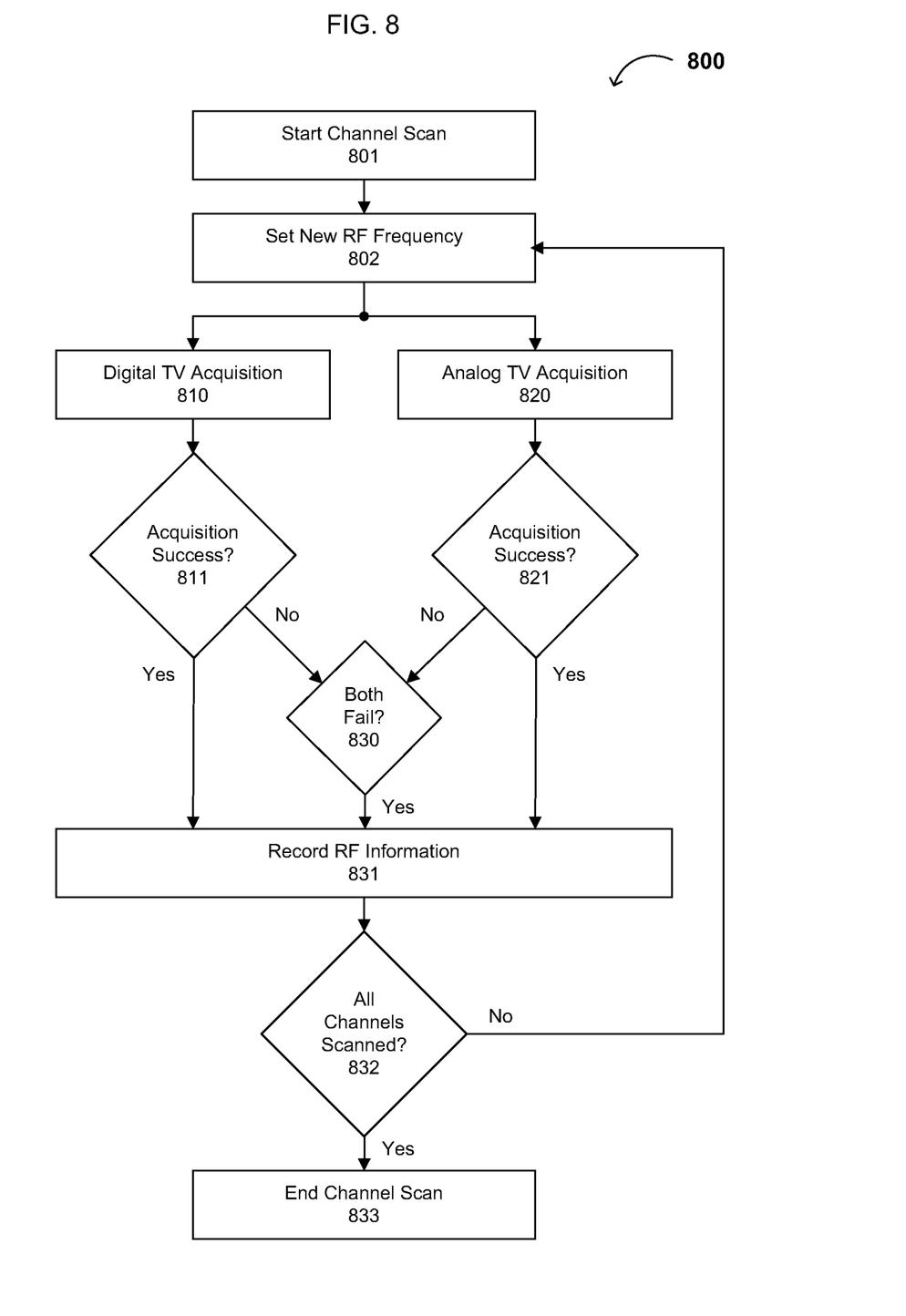
FIG. 8 is a flowchart of an exemplary method for scanning channels in a television signal receiver.

FIG. 8 shows a flowchart of an exemplary method 800 for scanning channels in a television signal receiver. The channel scanning method may be used, for example, to pre-determine the signal format, transmission parameters, preview images, and/or other characteristics of a group of television signals. At step 801, the channel scan operation begins. At step 802, a new (or first) channel (e.g., a radio frequency or range of radio frequencies allocated to a channel) is selected and tuned. At step 810, the method attempts to acquire a digital television signal from the selected channel. While step 810 is being performed, step 820 is also performed to attempt acquisition of an analog signal from the selected channel.

At step 811, the method determines whether a digital signal was successfully acquired, while at step 821 the method determines whether an analog signal was successfully acquired. If either acquisition step 810 or 820 succeeds, then the method proceeds to step 831 to record RF information relating to the current channel. Step 831 may include extracting transmission or other parameters from the signal, capturing preview and/or anchor images, and/or otherwise obtaining and/or storing characteristics of the channel.

At step 830 the method determines whether both acquisition steps 810 and 820 failed. If so, then the method proceeds to step 831 to record that no signal could be acquired from the channel. At step 832 the method determines whether there are more RF channels to scan. Some embodiments of the method may loop through a group of channels repeatedly (e.g., to continuously image and/or anchor images or other changeable characteristics). Other embodiments of the method may loop through a group of channels once (e.g., to initialize a channel list), at pre-determined events (e.g., every time the receiver is powered on), at regular intervals, etc. It will be recognized that the group of channels to be scanned may be changed at any time (e.g., in response to channel changes, changes to user preferences, etc.). If at step 832 the method determines that no more channels are to be scanned then the method proceeds to step 833 to terminate the scanning processing. If there are more channels to scan, then the method proceeds to repeat steps 802-832 for a new RF channel.

While the method shown in FIG. 8 includes one digital and one analog acquisition, it will be recognized that the concepts presented herein may be applied to multiple digital and/or analog formats and/or multiple modes or other variations of such formats.

Exemplary Software

The present invention also includes algorithms, computer program(s), firmware, and/or software, implementable and/or executable in a general purpose computer, a workstation equipped with a conventional digital signal processor, or any other device that may be configured to perform one or more steps of the methods and/or one or more operations of the hardware disclosed herein. For example, the computer program may be on any kind of readable medium, and the computer-readable medium may comprise any medium that can be read by a processing device configured to read the medium and execute code stored thereon or therein, such as a floppy disk, CD-ROM, magnetic tape or hard disk drive. Such code may comprise object code, source code and/or binary code.

Such software and/or firmware may also be adapted to configure or reconfigure one or more devices (e.g., a system on a programmable chip) having one or more general-purpose or re-usable components into one or more of the arrangements and/or to perform one or more of the operations described herein. Such devices may also be programmable or otherwise configurable (e.g., by updating software and/or firmware, programming a field programmable gate array [FPGA], etc.).

CONCLUSION/SUMMARY

Thus, the present invention provides apparatuses and methods for scanning channels in a television signal receiver. Embodiments of the present invention advantageously provide for faster scanning and acquisition of television signals in a mixed-format (e.g., analog and digital and/or multiple digital format) television distribution environment.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An apparatus for scanning channels in a television signal receiver, said apparatus comprising:
   a first acquisition circuit configured to determine, during a first time period, whether a first radio frequency channel has a first format and to produce a first acquisition indicator in response thereto;
   a second acquisition circuit configured to determine, during a second time period overlapping said first time period, whether said first radio frequency channel has a second format, wherein said second format is different from said first format, and to produce a second acquisition indicator in response thereto; and
   a controller configured to scan a plurality of radio frequency channels by operating, in response to states of said first acquisition indicator and said second acquisition indicator, said first acquisition circuit and said second acquisition circuit, wherein operation of said first acquisition circuit on said first radio frequency channel is terminated in said second time period if said second acquisition circuit successfully acquires said first radio frequency channel, and wherein operation of said second acquisition circuit on said first radio frequency channel is terminated in said first time period if said first acquisition circuit successfully acquires said first radio frequency channel.

2. The apparatus of claim 1, wherein said controller is further configured to select a second radio frequency channel from said plurality of radio frequency channels when one of said first and second acquisition indicators has a state indicating successful acquisition of said first radio frequency channel.

3. The apparatus of claim 1, wherein said controller is further configured to start operation of one of said first and second acquisition circuits on a second radio frequency channel of said plurality of radio frequency channels while the other of said first and second acquisition circuits continues to operate on said first radio frequency channel.

4. The apparatus of claim 1, wherein said controller is further configured to select a second radio frequency channel from said plurality of radio frequency channels when both of said first and second acquisition indicators have states indicating unsuccessful acquisition.

5. The apparatus of claim 4, wherein said state indicating unsuccessful acquisition comprises a timeout state.

6. The apparatus of claim 1, wherein said first format is a digital television format and said second format is an analog television format.

7. The apparatus of claim 6, further comprising:
   a tuner configured to tune said first radio frequency channel to produce an analog tuned signal; and
   an analog-to-digital converter (ADC) configured to convert said analog tuned signal into a digital tuned signal.

8. The apparatus of claim 7, wherein:
   said first acquisition circuit comprises a digital television demodulator; and
   operation of said first acquisition circuit is terminated when said digital television demodulator fails to demodulate said digital tuned signal.

9. The apparatus of claim 8, wherein:
   said second acquisition circuit comprises an analog television demodulator; and
   operation of said second acquisition circuit is terminated when said analog television demodulator fails to demodulate said digital tuned signal.

10. An analog and digital television receiver comprising the apparatus of claim 1.

11. The apparatus of claim 1, wherein said first format and said second format comprise different characteristics of a group of television channels selected from the group consisting of signal formats, television formats, modes of said television formats, transmission parameters, preview images, and anchor frames.

12. The apparatus of claim 11, wherein said first format comprises a first digital format and said second format comprises a second digital format.

13. A method for scanning channels in a television signal receiver, said method comprising the steps of:
   determining, in a first determining operation during a first time period, whether a first radio frequency channel has a first format and producing a first acquisition indicator in response thereto;
   determining, in a second determining operation during a second time period overlapping said first time period, whether said first radio frequency channel has a second format, wherein said second format is different from said first format, and producing a second acquisition indicator in response thereto;
   terminating said first determining operation during said second time period if said first channel is successfully acquired in said second determining operation;
   terminating said second determining operation during said first time period if said first channel is successfully acquired in said first determining operation; and
   scanning, in response to said first acquisition indicator and said second acquisition indicator, a plurality of radio frequency channels by repeating said determining and terminating steps for each one of said plurality of radio frequency channels.

14. The method of claim 13, wherein said scanning further comprises selecting a second radio frequency channel from said plurality of selected radio frequency channels when one of said first and second acquisition indicators has a successful state.

15. The method of claim 14, further comprising restarting the terminated determining operation on said second radio frequency channel while the other of said first and second determining operations operates on said first radio frequency channel.

16. The method of claim 13, wherein said scanning further comprises changing said first radio frequency channel to a newly selected channel from said plurality of selected radio frequency channels when both of said first and second acquisition indicators have unsuccessful states.

17. The method of claim 16, wherein said unsuccessful state comprises a timeout state.

18. The method of claim 13, wherein said first format is a digital television format and said second format is an analog television format.

19. The method of claim 18, further comprising steps of:
tuning said first radio frequency channel to produce an analog tuned signal; and
converting said analog tuned signal into a digital tuned signal.

20. The method of claim 19, further comprising attempting to demodulate a digital television signal from said digital tuned signal, wherein said first determining operation is terminated if said digital tuned signal is not successfully demodulated.

21. The method of claim 20, further comprising attempting to demodulate an analog television signal from said digital tuned signal or said analog tuned signal, wherein said second determining operation is terminated if said analog television signal is not successfully demodulated.

22. The method of claim 13, further comprising storing said first acquisition indicator, said second acquisition indicator, and/or derivatives thereof for each of said plurality of radio frequency channels.

23. The method of claim 13, wherein said first format and said second format comprise different characteristics of a group of television channels selected from the group consisting of signal formats, television formats, modes of said television formats, transmission parameters, preview images, and anchor frames.

24. A non-transitory computer readable medium comprising a computer executable set of instructions adapted to scan television channels, said instructions including steps of:

determining, in a first determining operation during a first time period, whether a selected radio frequency channel has a first format and producing a first acquisition indicator that has a first state if said selected radio frequency channel is successfully acquired with said first determining operation;

determining, in a second determining operation during a second time period overlapping said first time period, whether said selected radio frequency channel has a second format, wherein said second format is different from said first format, and producing a second acquisition indicator that has a second state if said selected radio frequency channel is successfully acquired with said second determining operation;

terminating said first determining operation during said second time period if said second acquisition indicator has said second state;

terminating said second determining operation during said first time period if said first acquisition indicator has said first state; and scanning, according to states of said first acquisition indicator and said second acquisition indicator, respectively, a plurality of radio frequency channels by repeating said determining and terminating steps for each one of said plurality of radio frequency channels.

25. The non-transitory computer readable medium of claim 24, wherein said first format and said second format comprise different characteristics of a group of television channels selected from the group consisting of signal formats, television formats, modes of said television formats, transmission parameters, preview images, and anchor frames.

* * * * *